United States Patent [19]

Celeste et al.

[11] Patent Number: 5,512,384

[45] Date of Patent: Apr. 30, 1996

[54] BATTERY AND METHOD OF BATTERY CONTROL FOR ENHANCING ELECTROCHEMICAL REACTIONS

[75] Inventors: Salvatore Celeste, Peabody; Anthony Cucinotta, Wakefield; Steven Panora, Malden, all of Mass.

[73] Assignee: Biocybernetics Laboratories Inc., Danvers, Mass.

[21] Appl. No.: 445,211

[22] Filed: May 18, 1995

Related U.S. Application Data

[63] Continuation-in-part of Ser. No. 231,744, Apr. 25, 1994.

[51] Int. Cl.[6] .............................. H01M 2/38; H01M 6/38
[52] U.S. Cl. .................. 429/51; 429/67; 429/72; 429/127; 429/27
[58] Field of Search .................. 429/14, 27, 50–52, 429/67, 68, 72, 110, 113, 127

[56] References Cited

U.S. PATENT DOCUMENTS

| | | | |
|---|---|---|---|
| 3,379,574 | 4/1968 | Grulke et al. | 429/116 |
| 3,432,354 | 3/1969 | Jost | 429/127 X |
| 3,494,796 | 2/1970 | Grulke et al. | 429/127 |
| 3,536,535 | 10/1970 | Lippincott | 429/127 X |
| 3,577,281 | 5/1971 | Pountney et al. | 429/127 X |
| 3,592,698 | 7/1971 | Baba | 429/68 X |
| 3,725,131 | 4/1973 | Pountney et al. | 429/127 X |
| 4,916,036 | 4/1990 | Chiiky | 429/127 |

*Primary Examiner*—Anthony Skapars
*Attorney, Agent, or Firm*—E. Lieberstein

[57] ABSTRACT

The battery includes an anode and cathode structure spaced a fixed distance apart, a movable conveyor having electrolyte impregnated therein and means for advancing the conveyor to engage the anode and/or cathode at the anode and/or cathode interface with electrolyte. In the preferred arrangement the moving conveyor containing the electrolyte is progressively advanced through the interface spacing between the anode and cathode while the interface spacing is maintained substantially constant even as the anode is consumed. Battery operation is terminated by separating the engaging surfaces of the anode and/or cathode from the moving conveyor and is reestablished by reengaging the anode and/or cathode surfaces with the moving conveyor.

11 Claims, 11 Drawing Sheets

BATTERY AND METHOD OF BATTERY CONTROL FOR ENHANCING ELECTROCHEMICAL REACTIONS

FIELD OF THE INVENTION

This application is a continuation-in-part of U.S. patent application Ser. No. 08/231,744 filed Apr. 25, 1994 entitled Galvanic Battery With Replenishable Electrodes and/or Electrolyte and more particularly to a battery and method for controlling the operation of a battery wherein electrolyte is contained on a movable conveyor held in engagement with the interface surface of the anode and/or cathode structure(s) while the interface spacing between the anode and cathode surface(s) is maintained substantially constant even as the anode is consumed.

BACKGROUND OF THE INVENTION

Battery systems using a thin flexible tape of electrode material have been suggested in the prior art for supplementing or replenishing the supply of anode as well as electrolyte to prolong the life of the battery. An example of a system employing an elongated tape of anode material fed from a supply reel to a take up reel is disclosed in U.S. Pat. No. 4,916,036. The anode described in this patent is supplied from an elongated tape composed of a reactive metal such as lithium wound on a reel and fed from a first chamber through a second reaction chamber containing a solution of electrolyte and cathode to a third chamber in which the tape is wound on a take up reel. The take up reel is driven by a motor under the control of a controller to advance the tape, preferably continuously, through the bath of electrolyte. A continuous fresh supply of anode material is intended to prolong the operation of the battery. Another battery system using a strip of tape containing segments of individual battery cells is taught in U.S. Pat. No. 3,494,796. In this patent each battery cell is composed of its own anode and cathode separated by a layer impregnated with electrolyte. The tape is advanced so that an external pair of collector plate's makes contact with each cell in succession. Thus only one cell at a time is connected to the terminals for heavy discharge while the other cells are held in reserve and discharge at a low level. U.S. Pat. No. 3,577,281 is yet another prior art teaching using an elongated tape coated with an anode material which is driven into a solution of electrolyte.

In a copending application of the joint inventors U.S. Ser. No. 08/231,744 an elongated tape is described containing segmented sections of anode material and/or a source of supplemental electrolyte which is progessively fed into the active electrochemical compartment to control the duration of battery operation. The elongated tape functions as a moving conveyor which is preferably interconnected to form an endless loop. The electrolyte is impregnated into the substrate of the moving conveyor belt.

In accordance with the present invention the moving conveyor, preferably arranged in the form of an endless belt containing impregnated electrolyte, is advanced between an anode and cathode assembly to engage the anode and/or cathode interface surface(s). The anode/electrolyte interface and/or the cathode/electrolyte interface is controlled by the dynamic interaction occuring at the engaging surfaces while simultaneously adjusting the interface spacing to maintain the spacing substantially constant during the elctrochemical reaction. The anode is preferably aluminum or an aluminum alloy although any conventional anode material may be used such as zinc, magnesium, lithium etc. The cathode is preferably an air cathode. The electrolyte is selected for compatibility with the anode material and is preferably impregnated on the moving conveyor as an aqueous medium or in the form of a gel or a microencapsulated composition or is a solid.

It has been discovered in accordance with the present invention that by reacting electrolyte impregnated on a moving conveyor held in physical contact with the surfaces of an anode and cathode structure while maintaining the interface spacing between the anode and cathode surfaces constant it is possible to overcome the problems attributable to electrolyte depletion, surface passivation and oxide build up. As a result of controlling the anode/electrolyte interface and/or the cathode/electrolyte interface in accordance with the present invention by-product build up of dendrite formation, gassing and corrosion are controllable and readily minimized.

The benefits of the present invention will become apparent from the following detailed description of the invention and include extended shelf life, indefinite periods of dormancy under direct operator control, on/off ability, substantially level discharge over the life of the battery with each resumption of electrochemical activity following a period of dormancy occuring at full voltage independent of the period of dormancy and controlled energy densities up to and above 400 k Wh/kg.

SUMMARY OF THE INVENTION

The galvanic battery of the present invention broadly comprises an anode and cathode structure having an anode and cathode surface spaced a fixed distance apart to form a predetermined interface spacing, a movable conveyor containing impregnated electrolyte, means for advancing said conveyor through said interface spacing so as to physically engage said anode and/or cathode surface to cause an electrochemical reaction between said anode, cathode and electrolyte and means for adjusting the position of said anode and cathode relative to one another to maintain said interface spacing substantially constant even as the anode is consumed.

In addition, the present invention includes a method for dynamically controlling the operation of a battery having an anode and cathode structure and a relatively fixed interface spacing between the anode and cathode which comprises the steps of impregnating a movable conveyor with electrolyte, advancing the conveyor through the interface spacing so as to physically engage said anode and/or cathode structure with said electrolyte to cause an electrochemical reaction between said anode, cathode and electrolyte while simultaneously adjusting the position of said anode and cathode structure relative to one another to maintain said interface spacing substantially constant even as the anode is consumed.

BRIEF DESCRIPTION OF THE DRAWINGS

Other objects and advantages of the present invention will become apparent from the following detailed description of the invention when read in conjunction with the accompanying drawings of which.

DETAILED DESCRIPTION OF THE INVENTION

Figure 1:
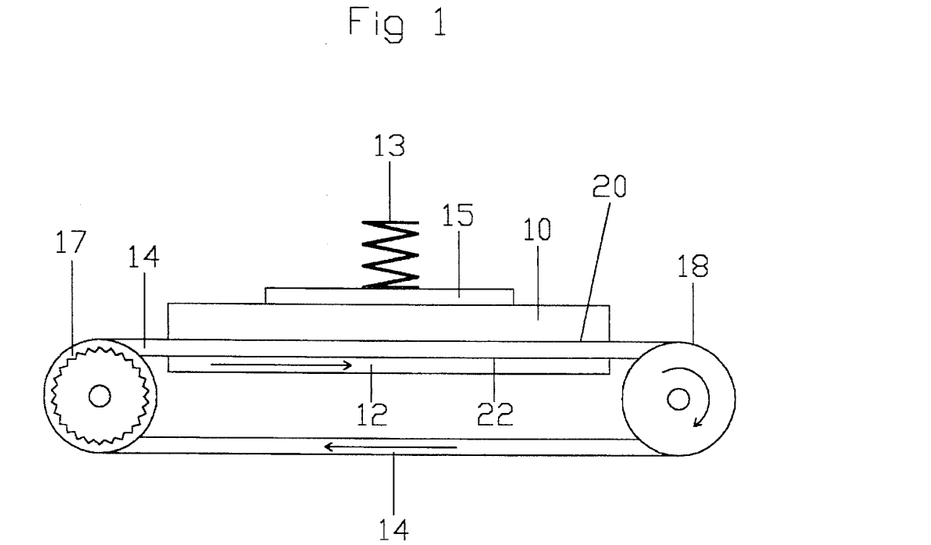
FIG. 1 is a side elevation view of a multi-cell unit of the battery of the present invention without a supporting shell.

The battery system of the present invention is diagramatically illustrated in FIG. 1 comprising an anode structure 10, a cathode structure 12 and a movable conveyor belt 14. The movable conveyor belt 14 contains a supply of electrolyte (not shown). The preferred method of incorporating electrolyte into the conveyor belt 14 is by impregnation. The term "impregnated" or "impregnated electrolyte" for purposes of the present invention means a supply of electrolyte contained in some fashion on the conveyor belt 14 for reacting with the anode and cathode. The specific method of impregnating electrolyte into the belt 14 is not part of the present invention and any belt construction may be employed which will permit the belt 14 to contain or to store electrolyte on its surface. One obvious embodiment would be to use a belt 14 composed of a porous material in which the electrolyte can be impregnated by absorption. Alternatively, the belt 14 can have a laminated or composite construction preferably as taught in copending U.S. patent application Ser. No. 08/231,744 the disclosure of which is herein incorporated by reference. An example of the latter case would be for the belt 14 to be constructed of a nonconducting polymeric composition such as polyethylene or polypropylene which can carry the electrolyte by capillary action or absorption. Alternatively, a superimposed coating or laminated layer may be used to contain the electrolyte. For non-aqueous electrolytes the belt 14 can be of a composite material including, for example, PEO (polyethylene oxide) which will carry electrolyte by means such as Van DerWaals forces. Alternatively a solid electrolyte may be used.

Figure 3:
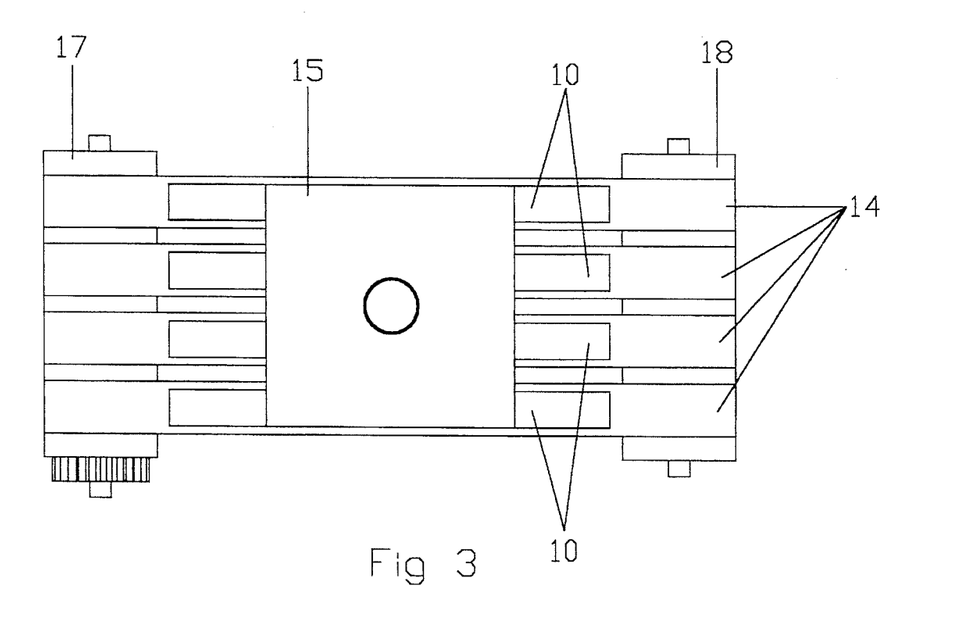
FIG. 3 is a top view of FIG. 1.
Figure 12A:
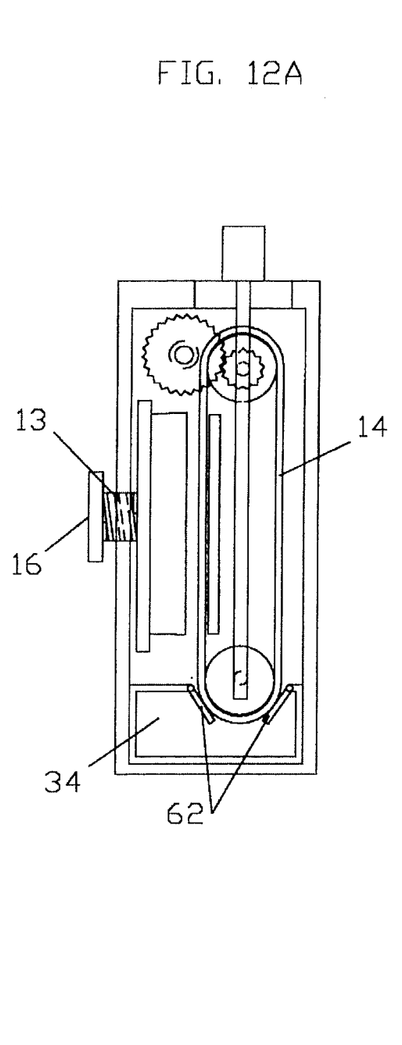
FIGS. 12A and 12B is a side and top view of an assembled cassette battery system for the battery of FIG. 5 in the inactive position.
Figures 12B, 12C:
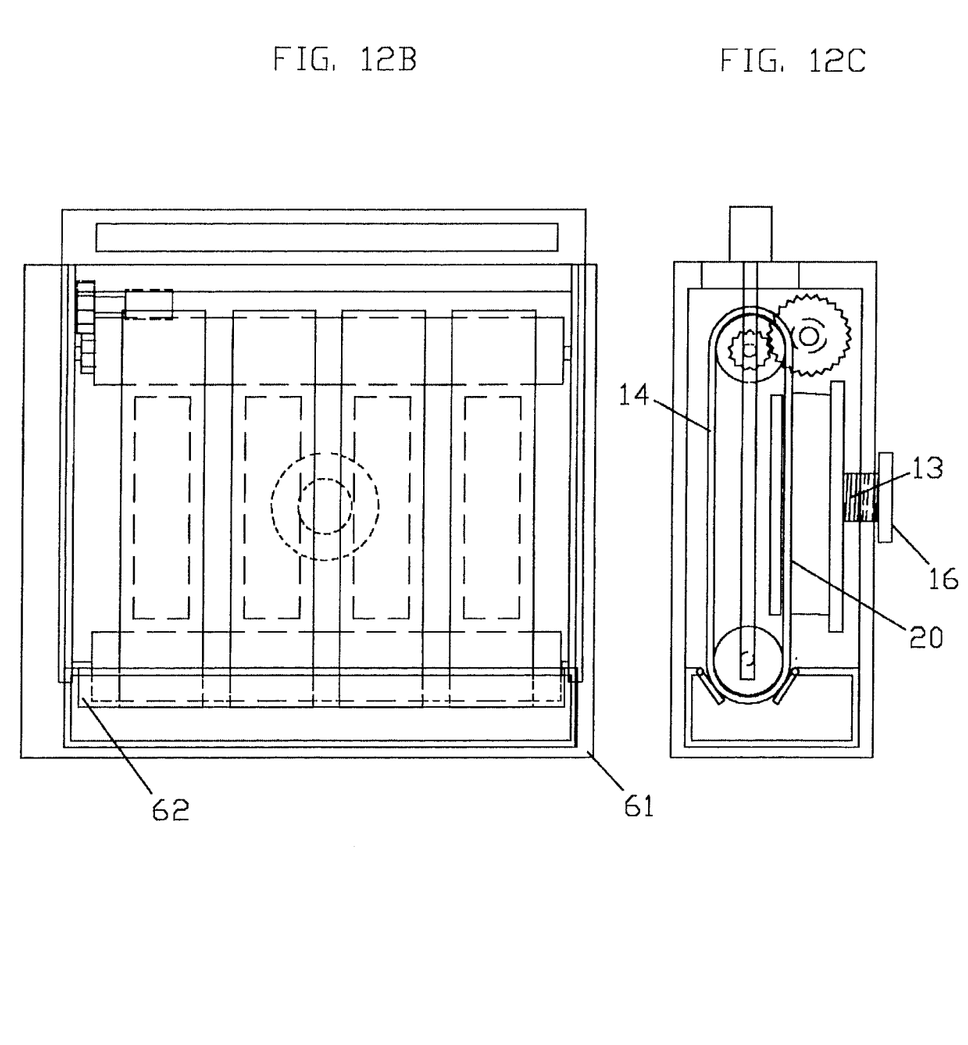
FIG. 12C is a side view of the assembled cassette battery system of FIG. 12B with the battery in the active position.

The movable conveyor belt 14 is preferably connected to itself to form an endless belt in an arrangement as shown in FIG. 1 or in FIG. 12. An endless belt configuration is however not essential to the present invention. In the embodiment of FIG. 1 the belt 14 forms a closed loop of finite length which is driven by two rollers or pulleys 17 and 18, either one or both may be driven to progressively advance the belt 14 into contact with the interface surfaces 20 and 22 of the anode and cathode structures 10 and 12 respectively. Where the length of the belt 14 is relatively short as in the embodiment of FIG. 1, as opposed to the embodiment of FIGS. 12 and 13 where the belt is of substantial length, it is preferred that an additional supply of electrolyte be provided in addition to the supply of electrolyte contained on the belt 14 itself. Additional aqueous electrolyte can be supplied from a separate source preferably stored in a container within the battery housing as shown in the embodiment of FIG. 3. When gelled or microencapsulated electrolyte is used it may be possible to operate the battery for an extended period without an additional supply of electrolyte.

The anode structure 10 is preferably composed of aluminum metal or an aluminum composition with the interface surface 20 having a preferably planar surface geometry and of predefined surface area. Other anode materials such as zinc, magnesium, lithium etc. may also be used. The cathode structure 12 is preferably an air electrode. An air cathode, as is well known in the art, is typically in the form of a sheet like member having opposite surfaces with one surface exposed to the atmosphere and the other surface exposed to the electrolyte of the cell such that during battery operation atmospheric oxygen dissociates while metal from the anode oxidizes to provide electron flow between the anode and cathode. The air cathode must contain an electrically conductive element and be permeable to air. In addition the air cathode should be substantially hydrophobic to any aqueous electrolyte so that aqueous electrolyte will not seep through. Conventional air cathodes are formed from active carbon containing finely divided hydrophobic polymeric material and a metal screen which serves as the conductive element.

Any conventional electrolyte such as potassium hydroxide (KOH) may be contained in the belt 14. The electrolyte composition may be liquid or gelled. A gelled composition will substantially function as a liquid composition and may also be replenished using an aqueous bath.

Conceptually the battery of the present invention operates by controlling the anode/electrolyte interface and/or cathode/electrolyte interface while simultaneously adjusting the relative position between the cathode and anode structures so that the interface spacing between the active anode and cathode surfaces is maintained relatively constant. In the embodiment of FIG. 1 the interface spacing is controlled by the spring member 13 such as, for example, a compression spring engaging a plate 15 upon which the anode structure 10 is mounted so as to apply a force to urge the anode structure 10 toward the cathode structure 12. The force should be uniform so that the interface spacing between the anode surface 20 and cathode surface 22 is uniform over its entire surface area and is held relatively constant as anode metal is being electrochemically consumed. This results in the active anode surface 20 and/or cathode surface 22 being continually wiped clean by action of the moving conveyor belt 14. The conveyor belt 14 can be driven over a very wide range of speeds. Any speed may be selected which will accomplish the desired result of dynamically wiping the interface surfaces of the anode and cathode structures. Moreover the conveyor belt 14 need not be moved continuously. Intermittent movement may be equally as effective. The optimum driving speed of the conveyor belt 14 will depend upon its length and the composition of the electrolyte, the composition of the anode and cathode as well as the available surface area provided by the anode and cathode and most important as a function of the anticipated battery application.

The control of the interface surface(s) at the anode/electrolyte and at the electrolyte/cathode are the key to how efficiently a battery operates. There are many variables that come into play that influence this efficiency. This invention provides direct control over some of these parameters by providing control over these interfaces in a manner which has never been previously achieved.

Two highly influential phenomena that occur in most batteries are ohmic overpotential and concentrated overpotential. Ohmic forces or simply the resistance to the flow of ions and electrons result from different factors some inherent as in the conductivity of a certain concentration of electrolyte and some non-inherent like the thickness and buildup of oxides, hydroxides and by-products on anodes and cathode faces. It is the noninherent factors that this invention directly influences.

In most batteries an interfacial resistance buildup from reaction by-products is a major factor in contributing to constantly decreasing power output. If this buildup is minimized and controlled the power output will be improved. The use of a movable belt as taught in the present invention offers a practical method for minimizing some of the ohmic effects. The constant replenishment of fresh electrolyte and the removal of reaction-by-products in accordance with the teaching of the present invention dramatically minimizes such ohmic effects thereby maintaining the power output at a substantially constant level.

Another non-inherent feature of the present invention is the control of the thickness of the electrolyte layer. The thicker the layer the higher the interfacial resistance for any given chemistry. In accordance with the present invention control is maintained of electrolyte thickness by maintaining control over the interfacial contact with the anode and/or cathode surfaces and by control of the interface spacing. The latter may be accomplished by simply changing the thickness of the movable belt(s) 14.

The two factors, reaction by-product buildup and electrolyte thickness, have been the subject of numerous studies. The theoretical analysis in some of these treatises address the effect of these factors in a boundary layer analysis. These equations highlight the influence of these power controlling features. One equation based on Ohm's Law incorporates the cell current and the thickness of the boundary layer or gap between the electrodes is as follows:

$$\phi_c = \phi_a - [i^{cell}/k_{(y)}]S$$

S is the cell gap, $\phi_c$ and $\phi_a$ are the cathode solution potential and anode solution potential in volts respectively and $k(y)$ is the conductivity of the electrolyte. The influence of the thickness of the cell gap, S is directly proportional to the efficiency of a cell. As S approaches zero the power of the cell increases.

This invention has demonstrated the ability to offer control over at least two factors controlling this boundary layer or insulating layer. First the thickness of electrolyte is kept to a minimum and is constant. Secondly the reaction by-products are carried away thus maintaining a higher electrolyte conductivity. This allows the component, $k(y)$ to be consistently higher therefore improving power output.

Figure 2A:
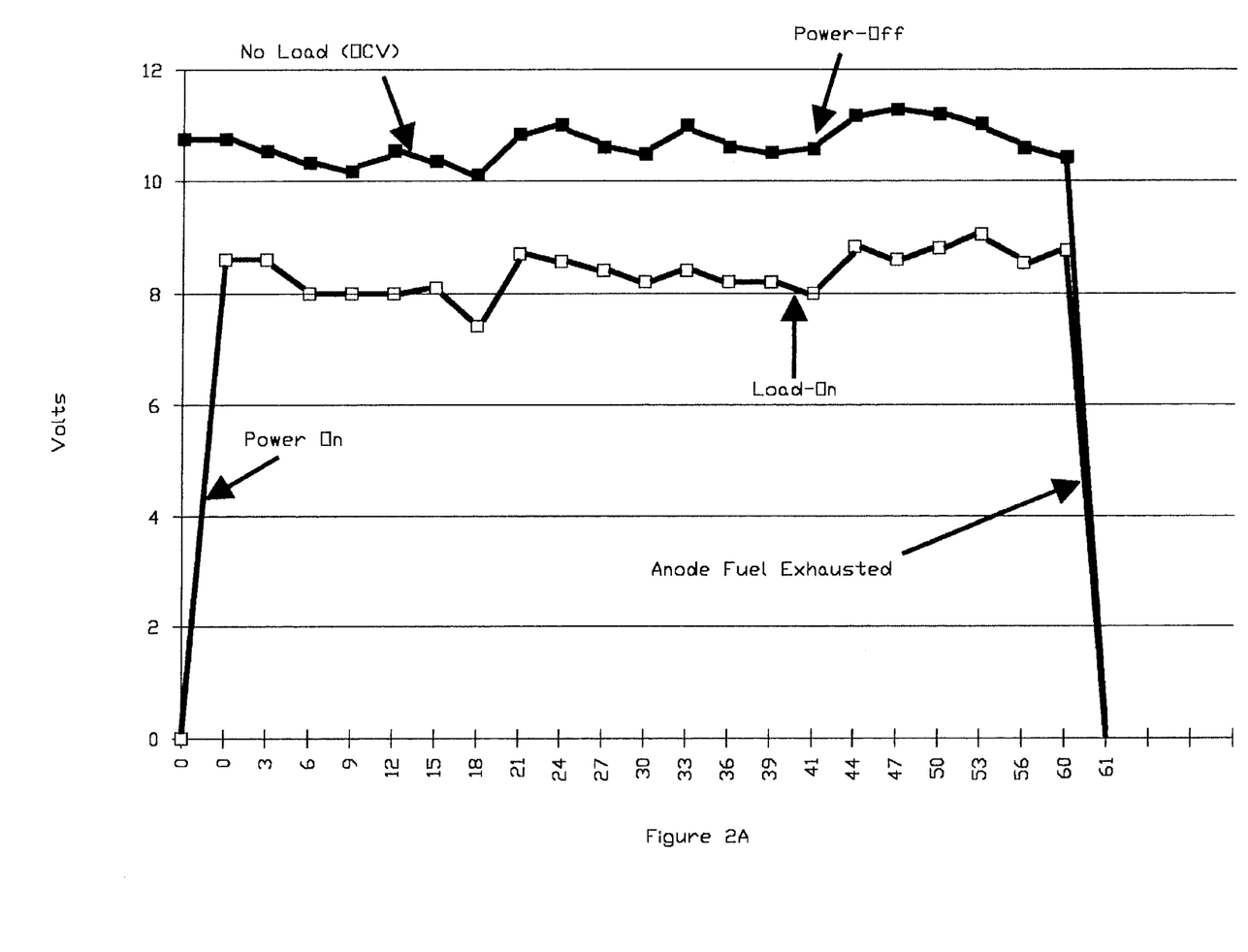
FIGS. 2A and 2B are typical discharge profiles for the battery of the present invention.
Figure 2B:
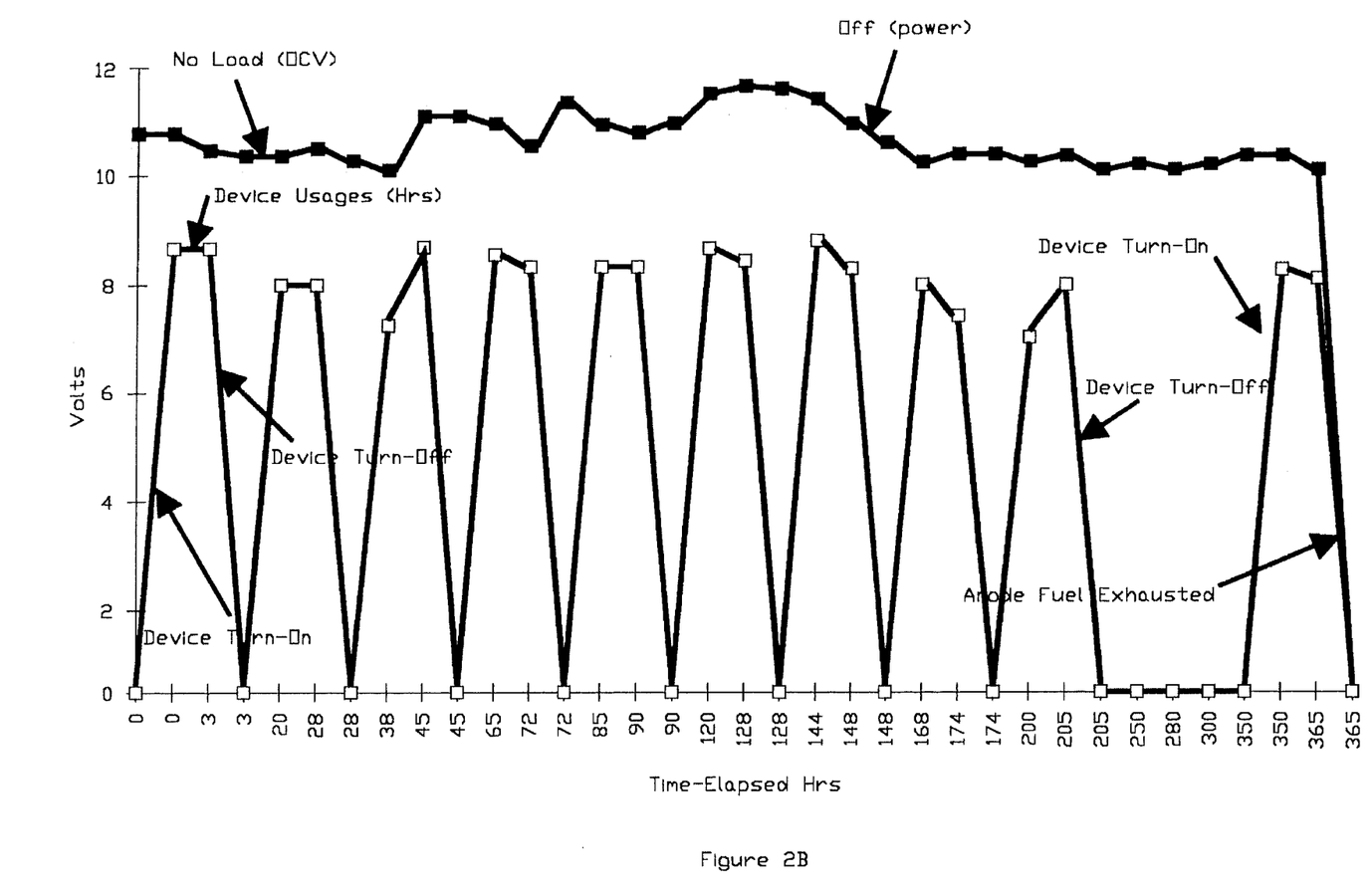

FIGS. 2A and 2B illustrate the advantages of the battery of the present invention by demonstrating that the battery returns to its original no load voltage state after the load is removed independent of the number of repeated cycles. This will continue until the supply of the anode is exhausted. In addition the state of the battery i.e. its "active" or "dormant" state is under the control of the operator. It should further be understood that the period of "dormancy" i.e., when the battery is off or non-functioning, may be indefinite and that during any period of "dormancy" the anode and/or cathode may be readily replaced. The endless belt design of the present invention facilitates control over the disengagement between the movable conveyor belt and the anode and cathode structures respectively. This disengagement can be either manually or electronically controlled and, if desired, may be remote controlled. Although battery operation may also be terminated simply by stopping movement of the conveyor belt without disengaging the belt from the anode and/or cathode this is not a desirable way to terminate battery operation since some battery discharge will still occur since residual electrolyte on the belt surface is still present. Moreover, the anode surface will corrode if the belt remains in contact with the anode.

The preferred method of terminating battery operation is by physically separating the anode structure 10 from the movable conveyor 14. In accordance with the preferred arrangement the anode structure 10 is mounted upon a manually retractable plate 15 such that the anode 10 is retractable relative to the belt 14. In this way the anode 10 can be manually shifted into a retracted position (shown only in connection with the cassette embodiment of the present invention in FIGS. 12A and 12C respectively) in order to disengage the anode 10 from the belt 14. The anode may then be manually shifted back into the engaged position. In the retracted position the plate 15 and as such, anode 10 is physically separated from the belt 14. The plate 15 may, in turn, be connected to a push button switch 16 to enable the anode position to be manually adjustable as is more clearly shown in connection with the cassette embodiment shown in FIGS. 10 through 13 or its position may be controlled electrically by means of a solenoid (not shown). Electrical control may also be used to turn off the electrical power to the motor driving the pulleys 17 and/or 18 for stopping the belt 14. Alternatively the operation of the belt 14 may be independently controlled. Retraction of the plate 15 terminates operation of the battery thereby switching the battery from its "on" position to an inactive or battery "off" position and vice versa upon depressing the push button switch 16 which repositions the anode 10 back into engagement with the belt 14. This on/off control of the present invention is reflected in discharge curves 2A and 2B.

Figure 10A:
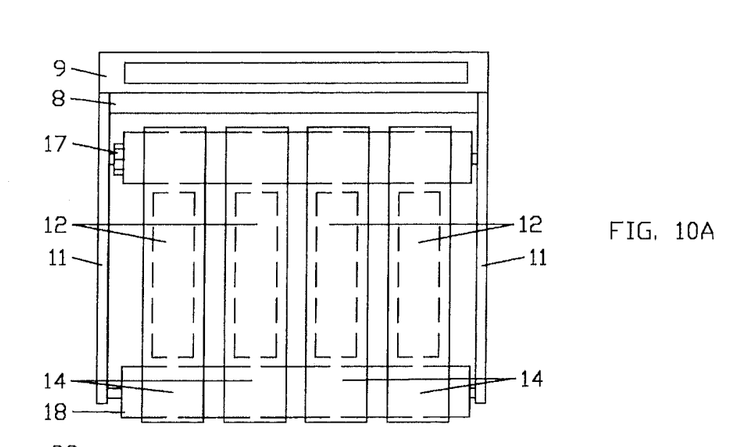
FIGS. 10A and 10B show a front and side view of a removable cassette cathode assembly for the battery of FIG. 5.
Figure 10B:
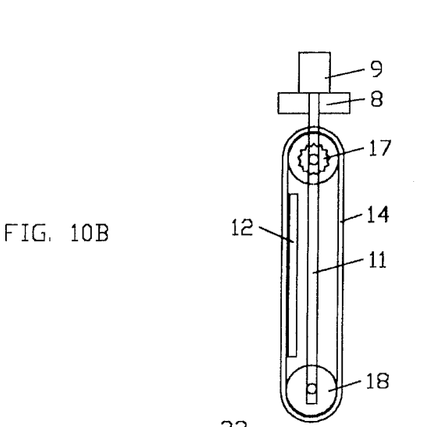
Figure 11A:
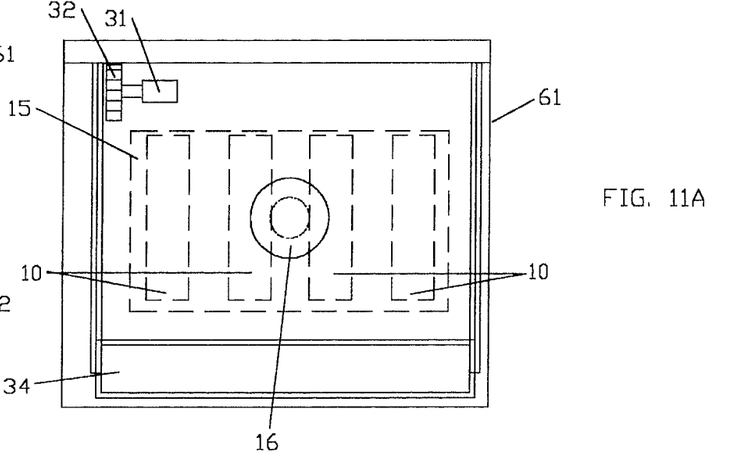
FIGS. 11A and 11B is a top and side view of a removable cassette anode assembly to receive the removable cassette cathode assembly of FIGS. 10A and 10B respectively.
Figure 11B:
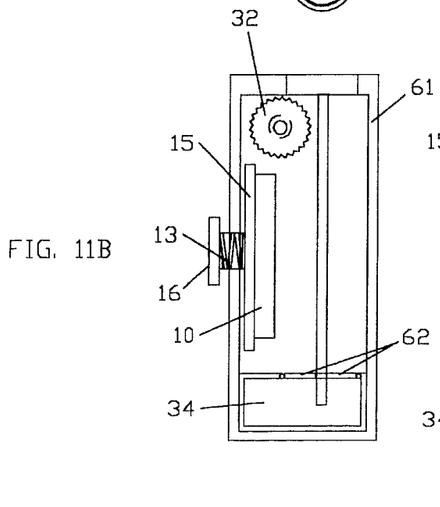

The battery of the present invention may be of one cell construction or multi-cell construction. In a multi-cell arrangement, which is preferred, the battery contains multiple anode structures 10, as is more clearly shown in FIGS. 3, 6, 9 and 11 and corresponding multiple cathode structures 12 (not shown) and multiple spring means 13 (not shown). Accordingly, in a multi-cell battery each battery cell will include an anode structure 10, a cathode structure 12, a conveyor belt 14 and spring means 13 although a single common conveyor belt 14 may be used for all of the cells. All of the anode structures 10 may be mounted on one retractable plate 15 connected to a push button switch 16 so that they may all be retractable as a unit. Moreover, a separate spring means 13 may be used for each battery cell or one spring means 13 may be used in common for all of the battery cells. When the anode structure(s) 10 are included in a cassette as shown in FIGS. 10–11 the single cassette may then be used to replace the anode structure(s) 10 at one time as well as the retractable plate 15 and spring means 13.

Figure 4:
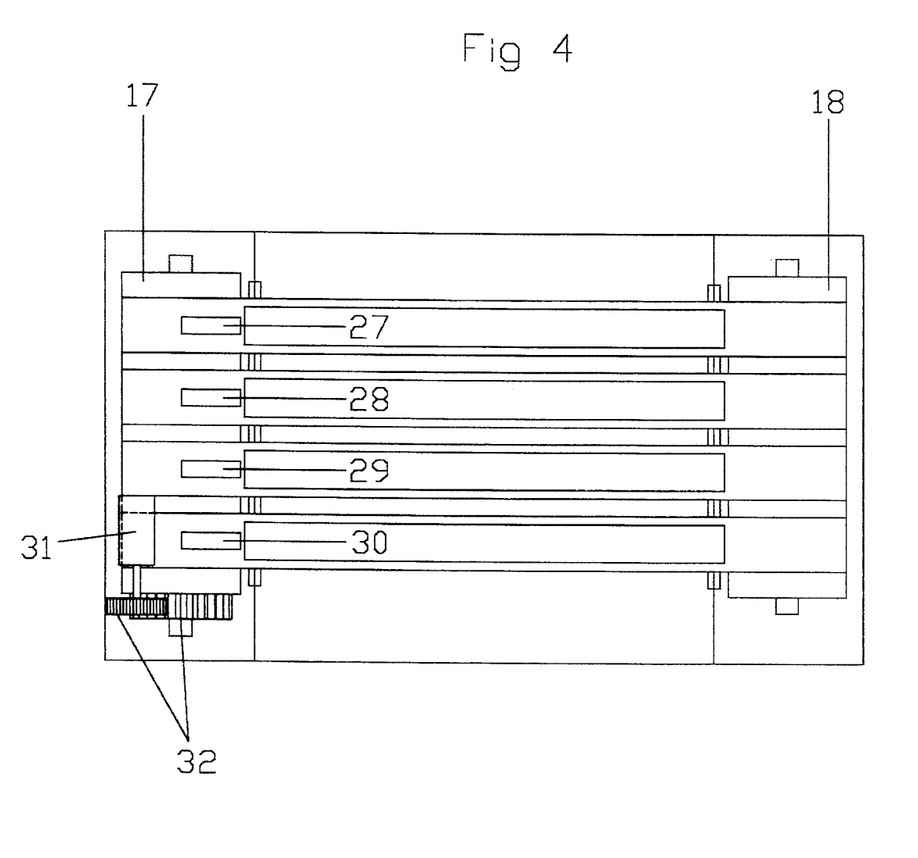
FIG. 4 is another top view of FIG. 1 illustrating multiple electrical contact terminals and a motor control assembly for the movable conveyor.

The conveyor belt 14 for each battery cell contains electrolyte as explained earlier. The output of each battery cell is connected to an electrical contact terminal as shown in FIG. 4 with each of the multiple contact terminals 27, 28, 29 and 30 corresponding to each one of the multiple battery cells to form a four cell unit. For an aluminum/air battery each cell generates 1.8–1.9 volts. All of the conveyor belts 14 are mounted on the pulleys 17 and 18 which drive the conveyor belts 14 in common. The pulleys 17 and/or 18 are rotatably controlled by a motor 31 through a gear assembly 32. It should be understood that any conventional drive system may be used to operate the pulley 17 and/or pully-(roller)18 for progressively advancing each conveyor belt 14 of each battery cell in accordance with the present invention.

Figure 5:
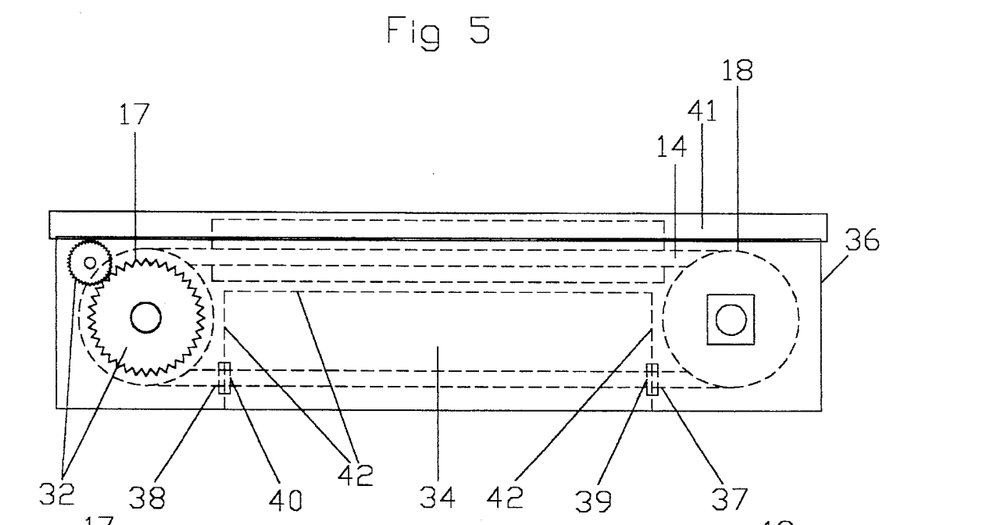
FIG. 5 is a side elevation of FIG. 1 showing the multi-cell unit contained in a battery casing.
Figure 6:
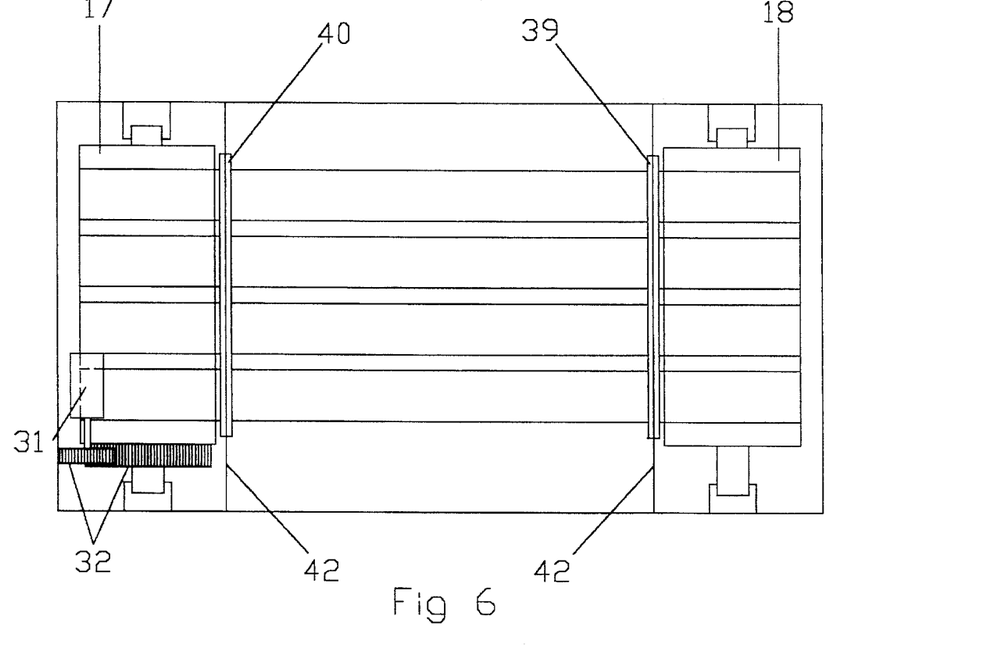
FIG. 6 is a top view of FIG. 5.

As explained earlier, when the electrolyte contained on the belt 14 is insufficient a supplemental supply of electrolyte may be needed. A simplified arrangement for providing additional electrolyte is shown in FIG. 5 in which an aqueous bath of electrolyte is included in a separate compartment 34 arranged within the housing shell 36 of the battery. The electrolyte compartment 34 has an inlet opening 37 for receiving the belt 14 and an outlet opening 38 through which the belt 14 exits. Seals 39 and 40 are provided at the inlet and outlet openings 37 and 38 to prevent the escape of electrolyte from the compartment 34 into the interior space of the battery shell 36 where it may come into contact with the anode and cathode structures and cause corrosion. As the belt 14 passes from the inlet opening 37 to the exit opening 38 the electrolyte in the belt 14 is replenished. FIG. 6 is a top view of FIG. 5 with the cover 41 of the shell 36 removed to illustrate a parallel arrangement of the seals 39 and 40 and the walls 42 of the electrolyte compartment 34.

Figure 7:
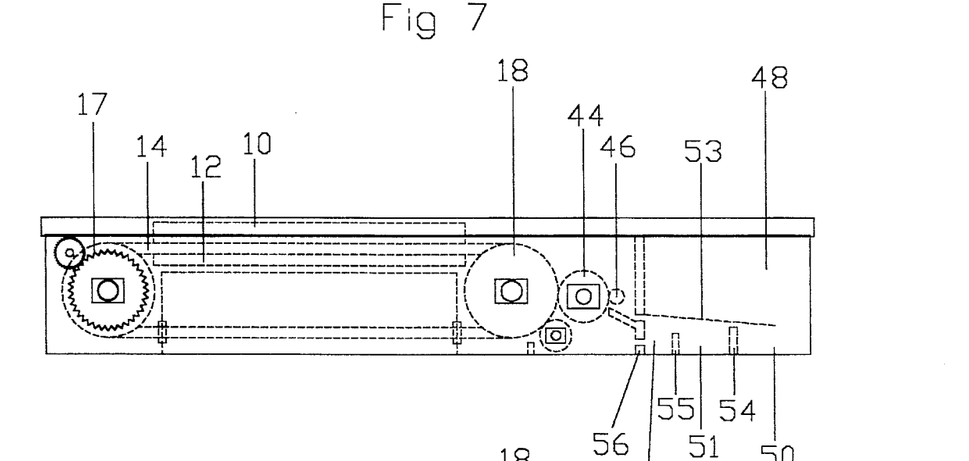
FIG. 7 is a side view of another embodiment of the battery as shown in FIG. 5 further including an electrolyte management system.
Figure 8:
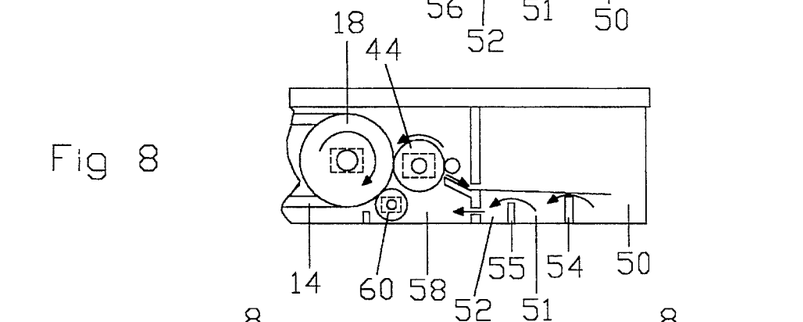
FIG. 8 is a sectional view taken along lines B—B of FIG. 7.
Figure 9:
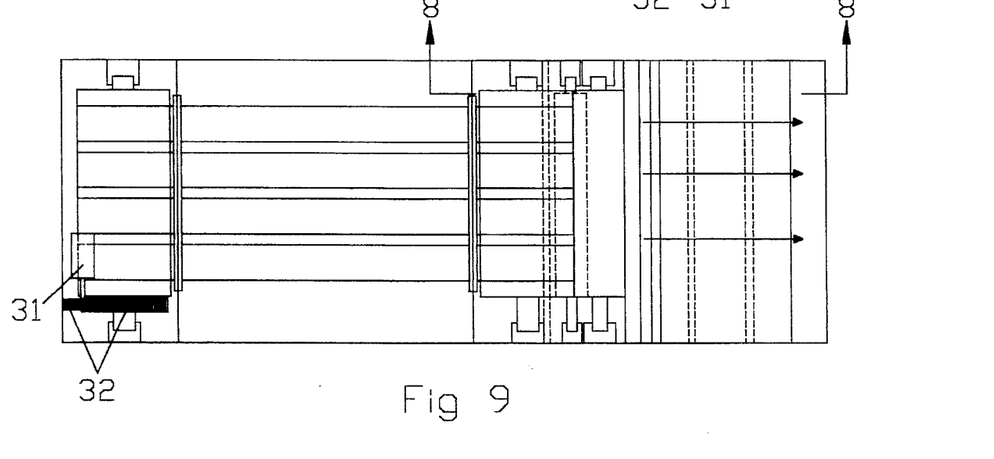
FIG. 9 is a top view of FIG. 7 with its cover removed.

Another arrangement for controlling supplemental electrolyte in accordance with the present invention is shown in FIGS. 6 through 9 inclusive in which a more complex electrolyte management system is used to replenish the electrolyte in the conveyor belt 14. In this arrangement electrolyte is recycled, purified and returned as fresh electrolyte in a closed system. The pully 18 as shown in FIG. 7 functions as a roller for the conveyor belt 14 which in turn engages an absorbent roller 44 as it traverses the pully 18. The absorbent roller 44 absorbs electrolyte from the belt 14 which as a result of the chemical reaction during battery operation contains precipitants and is no longer "fresh". The roller 44 in turn engages a solid roller 46 causing absorbed electrolyte to disgorge and flow into a chamber 48 where it is directed to flow into settling compartments 50, 51 and 52 which function to settle out precipitants from the electrolyte. The precipitants settle to the bottom of the settling compartments. The settling compartments are separated from one another by baffles 54, 55 and 56. The electrolyte is first directed from the solid roller 46 into settling compartment 50 with the aid of a tray 53. Baffle 54 directs the overflow of electrolyte from settling compartment 50 into compartment 51 and in turn baffle 55 directs overflow into compartment 52. The overflow from settling compartment 52 represents purged or filtered electrolyte and is directed into a confinement area 58 in contact with an absorbent roller 60 which is in engagement with the movable belt 14 on the pully 18 so as to supplement the belt 14 with fresh electrolyte.

A removable cassette arrangement for the battery of the present invention is shown in FIGS. 10–13 in which the cathode structure 12 and conveyor belt 14 is preferably part of a cassette which is removable from a battery housing 36A containing the anode structure 10. The conveyor belt 14 moves around a track 11 to which the pulley members 17 and 18 are attached. A handle 9 extending from a plate 8 permits the cassette to be readily removed as shown in FIGS. 10–13 respectively. In FIG. 12A the spring 13 and push button switch 16 is shown in its non-operative position with the anode 10 separated from the moving belt 14 leaving a gap 35A. In FIG. 12C the spring 13 and push button switch 16 is shown in its operative position with the anode 10 in contact with the moving belt 14 and figures of the battery as will be further explained in connection with FIGS. 10–11. The moving belt 14 may pass through an electrolyte compartment 34 with ends 34A acting as wipers. The cassette arrangement may also used to contain a plurality of components all of which may then be removable at one time for purposes of battery maintenance so that, for example, the anode and cathode structures may readily be removed and replaced when a predetermined amount of anode has been electrochemically depleted. The plate 15 should be retractable and may be included as part of the assembly incorporated in the removable cassette.

Figure 14:
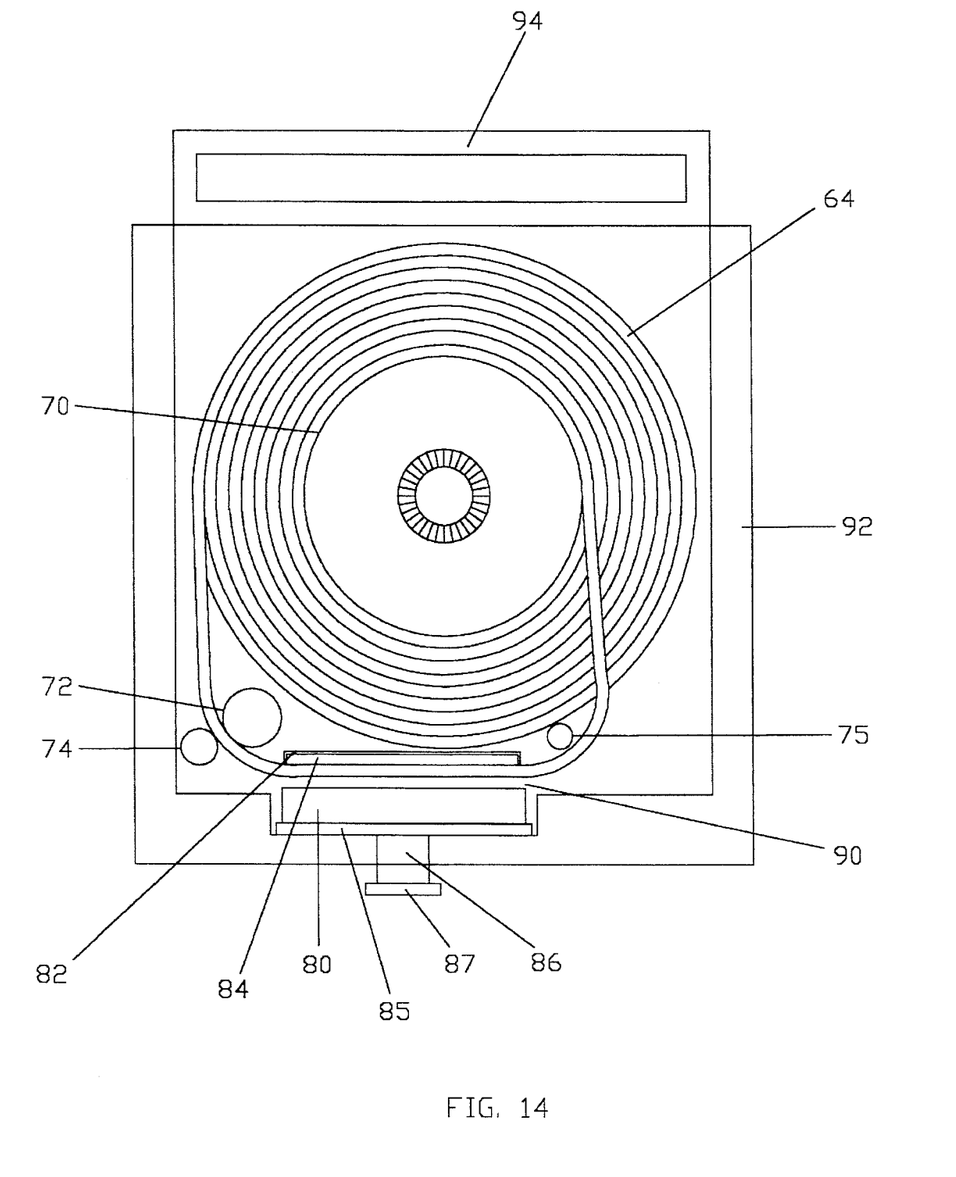
FIG. 14 is a diagrammatic drawing of another battery embodiment of the present invention employing a different endless belt arrangement from that shown in FIGS. 1–13.

Another embodiment of the battery of the present invention is shown in FIG. 14. This embodiment is similar to the embodiment of the battery described in U.S. parent patent application Ser. No. 08/231,744 the disclosure of which is herein incorporated by reference. In this embodiment the movable belt 64 may be represented by an elongated strip of flexible tape preferably stored on a single rotatable supply and take up reel 70 with the belt 64 preferably connected to itself in an endless belt configuration. The endless belt is cylindrically wound around a core of the supply reel with the inner winding thereof extending outwardly from the core and looped back to form the outer winding of the endless loop. The core may be advanced mechanically or electrically.

Figure 13:
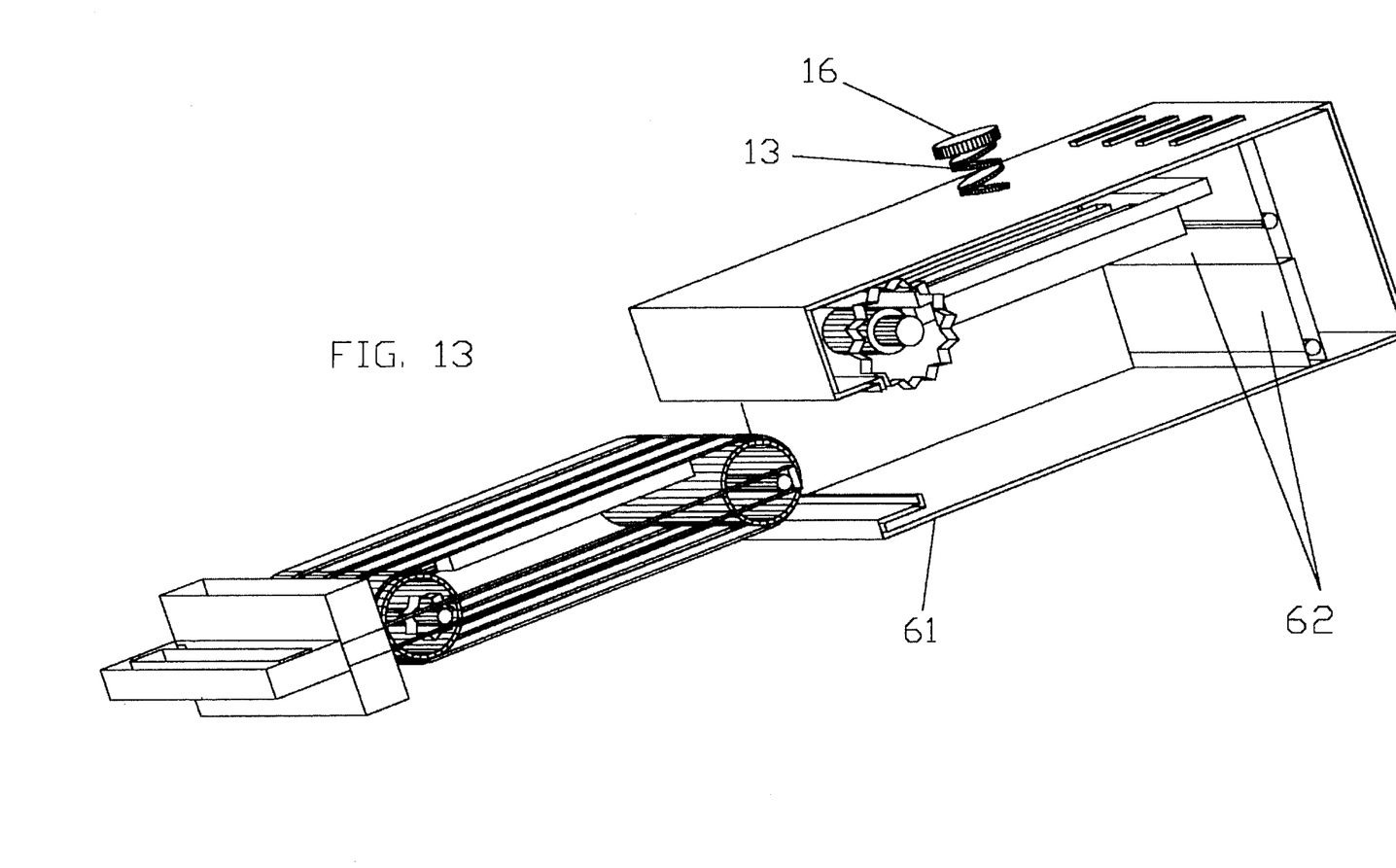
FIG. 13 is an exploded perspective view of the cassette battery system embodiment of the present invention as represented in FIGS. 10 through 12 respectively.
Figure 15:
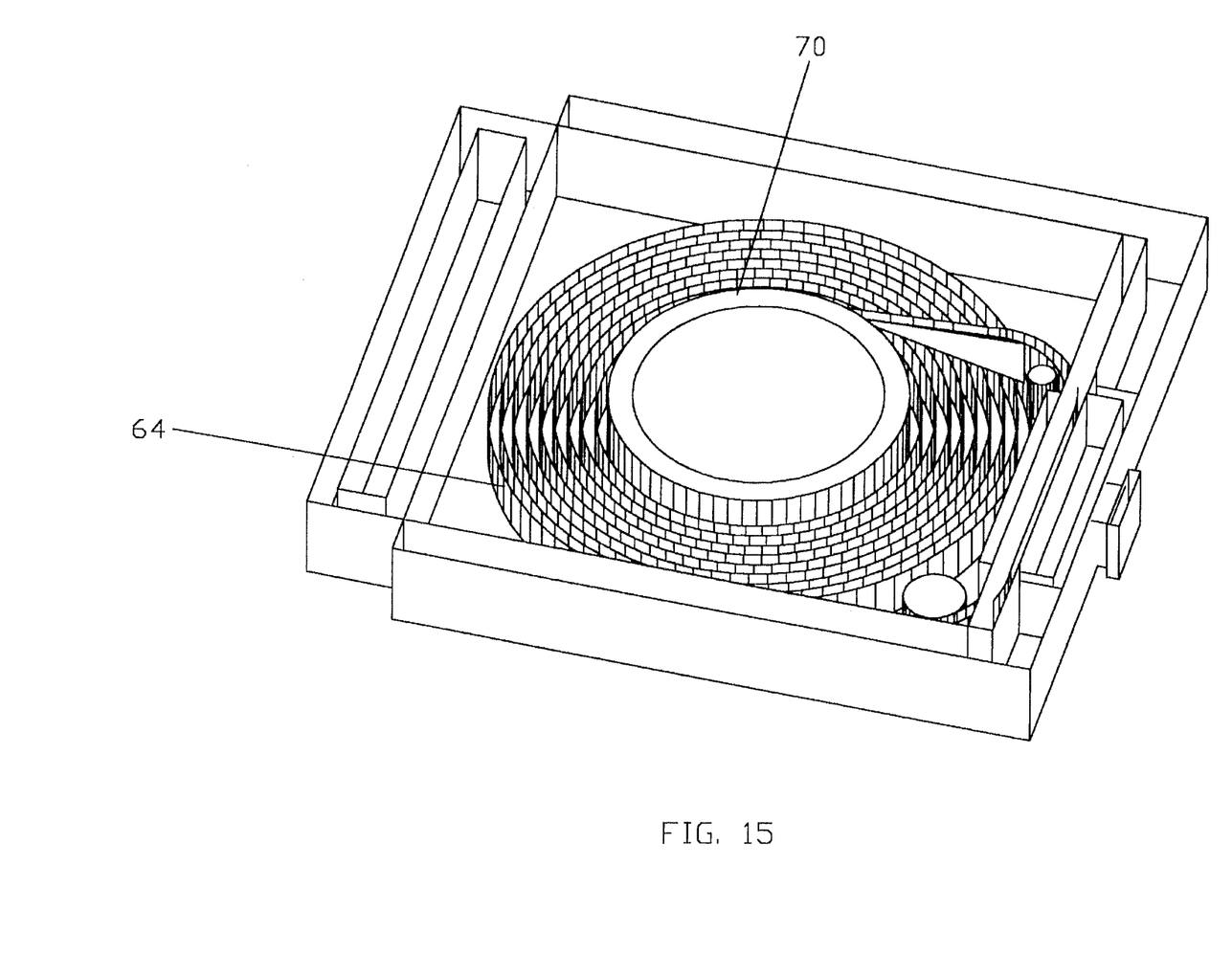
FIG. 15 is an isometric of FIG. 14.

The endless belt 64 contains electrolyte as explained above with regard to FIG. 1 and because of its length a supplemental supply of electrolyte may not be necessary. The belt 64 is driven by a drive roller 72 from a drive mechanism (not shown) and is guided by guide rollers 74 and 75 to pass through the interface between the anode 80 and cathode 82 respectively. The cathode 82 may be an air cathode with a membrane 84 of a porous polymer impermeable to liquids or gels but which allows air to pass. The anode 80 may be aluminum or any other suitable anode material composition and is mounted upon a retractable plate 85 connected to a manually movable switch member 87 for permitting a manually retractable operation to activate and deactivate the battery similar to that described in connection with FIGS. 1 and 3. A compression spring 86 functions to apply a force to urge the anode 80 in the direction of the cathode 82 such that when the switch member 87 is manually depressed into the battery "on" position (not shown) the anode 80 engages the belt 64 and the spring 86 maintains the anode 80 in uniform contact with the moving belt 64 as explained heretofore in connection with FIG. 1. The electrical terminal connections for the battery are not shown. The anode 80 is shown in its retracted position in FIG. 12 displaced from the belt 14 by a space 90. The frame 92 for the battery may include a handle 94 for portable transportation. The anode 80, the retractable plate 85 and the push button member 87 may be assembled in a cassette which can be removable from the frame 92. The overall unit is shown in isometric view in FIG. 15 representing a single cell. Additional cells can be stacked in tandem to achieve any desired power output. FIGS. 12 and 13 are somewhat simplified for purposes of explanation leaving out structural assembly details considered unrelated to the functional description.

What we claim is:

1. A battery comprising an anode structure having an anode surface and a cathode structure having a cathode surface with said anode and cathode surfaces spaced a fixed distance apart to form an interface, a movable conveyor containing electrolyte, means for advancing said conveyor through said interface so as to physically engage said anode and/or cathode surface with the electrolyte contacting said anode for causing an electrochemical reaction and means for adjusting the position of said anode and cathode structures relative to one another to maintain the spacing of said interface between said anode and cathode surfaces substantially constant even as the anode is consumed.

2. A battery as defined in claim 1 wherein said movable conveyor is connected to itself to form an endless belt.

3. A battery as defined in claim 2 wherein said movable conveyor is an endless belt having a fixed relatively short length.

4. A battery as defined in claim 3 further comprising a source of supplemental electrolyte.

5. A battery as defined in claim 4 wherein the electrolyte contained on said movable conveyor comprises aqueous electrolyte.

6. A battery as defined in claim 5 further comprising means for removing spent aqueous electrolyte from said endless moving conveyor belt at a first location, means for filtering said spent electrolyte and means for reimpregnating said endless moving conveyor belt with filtered electrolyte at another location downstream of said first location.

7. A battery as defined in claim 2 wherein said means for controlling said interface spacing comprises spring means in biased engagement with either said anode or said cathode or both to continuously adjust the interface spacing as anode material is consumed.

8. A battery as defined in claim 2 further comprising means for disengaging the surfaces between said anode or cathode or both relative to said moving conveyor so as to terminate the operation of said battery.

9. A battery as defined in claim 8 wherein said disengagement means is a manual retractable member connected to either said anode or cathode structure.

10. A battery as defined in claim 8 wherein said disengagement means is electronically controlled.

11. A method for dynamically controlling the operation of a battery having an anode and cathode structure and a relatively fixed interface spacing between a predetermined anode and cathode surface comprising the steps of: impregnating a movable conveyor with electrolyte; advancing the conveyor through the interface spacing so as to physically engage said anode and/or cathode surface at the interface with said electrolyte so as to cause an electrochemical reaction while simultaneously adjusting the position of said anode and cathode relative to one another to maintain said interface spacing substantially constant even as the anode is consumed.

* * * * *